US007110838B1

(12) United States Patent
Tada

(10) Patent No.: US 7,110,838 B1

(45) Date of Patent: Sep. 19, 2006

(54) METHOD AND APPARATUS FOR DOWNLOADING DATA TO PORTABLE DEVICES

(75) Inventor: Yukio Tada, Hamamatsu (JP)

(73) Assignee: Yamaha Corporation, Hamamatsu (JP)

(*) Notice: Subject to any disclaimer, the term of this patent is extended or adjusted under 35 U.S.C. 154(b) by 731 days.

(21) Appl. No.: 09/605,965

(22) Filed: Jun. 28, 2000

(30) Foreign Application Priority Data

Jun. 28, 1999 (JP) ................................ 11-182142

(51) Int. Cl.
*G06F 17/00* (2006.01)

(52) U.S. Cl. .......................... 700/94; 709/217; 84/601

(58) Field of Classification Search .................. 700/94; 709/203, 312, 213–214, 217–219, 229; 84/600–602, 84/610; 434/307 A, 307 R; 381/119, 1, 381/17–18, 63, 94.3, 94.2, 57, 110; 707/104.1, 707/10

See application file for complete search history.

(56) References Cited

U.S. PATENT DOCUMENTS 5,355,302 A * 10/1994 Martin et al. ............... 364/410
5,619,425 A * 4/1997 Funahashi et al. .......... 364/514
5,679,911 A * 10/1997 Moriyama et al. ............ 84/601
5,808,224 A * 9/1998 Kato .......................... 84/609
5,824,934 A * 10/1998 Tsurumi et al. ............... 84/609
5,880,386 A * 3/1999 Wachi et al. ................. 84/601
5,890,910 A * 4/1999 Tsurumi et al. ......... 434/307 A
6,083,009 A * 7/2000 Kim et al. .............. 434/307 A
6,195,503 B1 2/2001 Ikedo et al.
6,278,048 B1 * 8/2001 Lee ............................ 84/610
6,487,663 B1 * 11/2002 Jaisimha et al. ............ 713/193
6,693,236 B1 * 2/2004 Gould et al. .................. 84/477
6,925,489 B1 * 8/2005 Curtin ........................ 709/217

FOREIGN PATENT DOCUMENTS

JP 09-138690 5/1997
JP 10-229545 8/1998
JP 11-120188 4/1999
JP 11-145955 5/1999
JP 11-163808 6/1999

* cited by examiner

*Primary Examiner*—Vivian Chin
*Assistant Examiner*—Lun-See Lao
(74) *Attorney, Agent, or Firm*—Morrison & Foerster LLP

(57) ABSTRACT

There are provided a download system and a download control method for portable players, which enable a user to download music data to the portable player by a simple operation, and a storage medium that stores a program for executing the download control method. The portable player includes a storage medium that stores music data having type data. A download device downloads previously stored music data to the storage medium of the portable player. A center station transmits music data having type data to the download device. In the download device, the type data of the music data stored in the storage medium is read in as known type data when the portable player is placed on a table. Type data input by a user is read in as desired type data. The type data of the music data transmitted from the center station is read in as new type data. When the desired type data is equal to the new type data and the new type data is different from the known type data, the music data transmitted from the center station is stored in a data memory device, and the stored music data is downloaded to the storage medium. Then, the new type data is written as known type data.

7 Claims, 4 Drawing Sheets

METHOD AND APPARATUS FOR DOWNLOADING DATA TO PORTABLE DEVICES

BACKGROUND OF THE INVENTION

1. Field of the Invention

The present invention relates to a download system, download control method, and storage medium for portable players, which are suitable for downloading music data to portable players including storage media.

2. Prior Art

A portable player is generally used, which has a flash EEP-ROM inside as a storage medium, which has a storage capacity of about 32 or 64 Mbytes to store music data. By regenerating the stored music data, a user listens to corresponding music via headphones or the like. Such a portable player is generally called an "MP3 portable player" because the compressed storage method based on the MPEG Audio Layer 3 is used to store music data in the flash EEP-ROM.

Then, downloading carried out by a portable player according to the prior art will be described with reference to FIG. 4.

Reference numeral 1 denotes an MP3 portable player acting as a portable player and which has a flash EEP-ROM (Electrically Erasable Programmable Read Only Memory) 2 inside as a storage medium.

Reference numeral 3 denotes a table on which the portable player 1 is placed and which has an accommodating recess 3A formed therein for accommodating the portable player 1. The accommodating recess 3A has a terminal, not shown, for outputting music data to the portable player 1. In addition, the table 3 has connected thereto an interface 12 (hereafter referred to as "the I/F 12") of a personal computer 4, described later. After the portable player 1 has been placed on the table 3, the personal computer 4 is operated to download music data stored in an HDD 9 of the personal computer 4, to the flash EEP-ROM 2 of the portable player 1.

The personal computer 4 has a CPU 5 for controlling the entire personal computer, a ROM 7 that stores a control program and data which are used by the CPU 5 to control components which are connected to the CPU 5 via a bus 6, and a RAM 8 for storing various data and results of arithmetic operations. In addition, the personal computer 4 has a hard disc drive 9 (hereafter referred to as "HDD 9") that stores music data, a panel interface 10 (hereafter referred to as "the panel I/F 10") composed, for example, of a keyboard for inputting a command signal to the CPU 5, an MPEG encoder 11 that operates when music data stored in the HDD 9 are downloaded to the flash EEP-ROM 2 of the portable player 1, to encode the music data into MPEG codes, the I/F 12 for connecting the personal computer 4 to the table 3, and an interface 14 (hereafter referred to as "the I/F 14") for connecting the personal computer 4 to a CD player 13.

Next, an operation will be described, which is performed when a user stores music data in the flash EEP-ROM 2 of the portable player 1.

First, when the user uses the personal computer 4 to store his favorite music data in the HDD 9 from a compact disc (CD) or the like, the stored music data is encoded by the MPEG encoder 11, and the encoded data is downloaded to the flash EEP-ROM 2 of the portable player 1 via the table 3. Thus, by carrying only the portable player 1, the user can listen to his favorite music anywhere.

With the above portable player 1 according to the prior art, the user must store music data in the HDD 9 of his personal computer 4 from a CD. Disadvantageously, this operation requires a large amount of time and is cumbersome.

In addition, according to the prior art, to download music data to the portable player 1, the user must prepare a required CD or the like for each downloading operation. Disadvantageously, for CDs that are not easily available, music data cannot be easily downloaded to the portable player.

SUMMARY OF THE INVENTION

It is an object of the present invention to provide a download system and a download control method for portable players, which enable a user to download music data to the portable player by a simple operation, and a storage medium that stores a program for executing the download control method.

To attain the above object, the present invention provides a download system for a portable player, comprising a portable player including a storage medium that stores music data having type data, a download device that downloads previously stored music data to the storage medium of the portable player, and a center station that transmits music data having type data to the download device.

In a preferred form of the download system according to the present invention, the download device comprises a table on which the portable player is placed when music data is downloaded to the portable player, a reception device that receives the music data having the type data transmitted from the center station, an input device that inputs type data of desired music required by a user, a data memory device that stores the music data transmitted from the center station, and a control device that operates based on the type data of the music data received by the reception device, the type data of the music data previously stored in the storage medium of the portable player, and the type data input by the input device, to control selection of the music data from the center station, storage of the selected music data in the data memory device, and downloading of the music data to the storage medium of the portable player.

In a further preferred form of the download system according to the present invention, the control device comprises a known type data read-in device that reads in, as known type data, the type data of the music data stored in the storage medium of the portable player when the portable player is placed on the table, a desired type read-in device that reads in, as desired type data, the type data input by the user using the input device, a new type data read-in device that reads in, as new type data, the type data of the music data received by the reception device, a determination device that determines whether or not the desired type data is equal to the new type data and the new type data is different from the known type data, a data storing device that stores the music data transmitted from the center station in the data memory device when the determination device determines that the desired type data is equal to the new type data and the new type data is different from the known type data, a downloading device that downloads the music data stored in the data memory device by the data storage device to the storage medium of the portable player, and a type data rewrite device that rewrites the new type data as known type data.

Preferably, the storage medium of the portable player comprises a writable ROM, and wherein the download device includes an encoding device that encodes music data into MPEG codes when downloading the music data to the ROM.

To attain the object, the present invention also provides a download control method for a portable player, comprising the steps of reading in, as known type data, type data of music data stored in a storage medium provided in a portable player when the portable player is placed on a table, reading in, as desired type data, type data input by a user, reading in, as new type data, type data of music data transmitted from a center station and received, determining whether or not the desired type data is equal to the new type data and the new type data is different from the known type data, storing the music data transmitted from the center station in a data memory device when the desired type data is equal to the new type data and the new type data is different from the known type data, downloading the music data stored in the data memory device to the storage medium provided in the portable player, and rewriting the new type data as known type data.

To attain the object, the present invention also provides a mechanically readable storage medium storing commands that allow a machine to execute the download control method according to the present invention.

The above and other objects of the invention will become more apparent from the following description taken in conjunction with the accompanying drawings.

DETAILED DESCRIPTION OF PREFERRED EMBODIMENT

Figure 1:
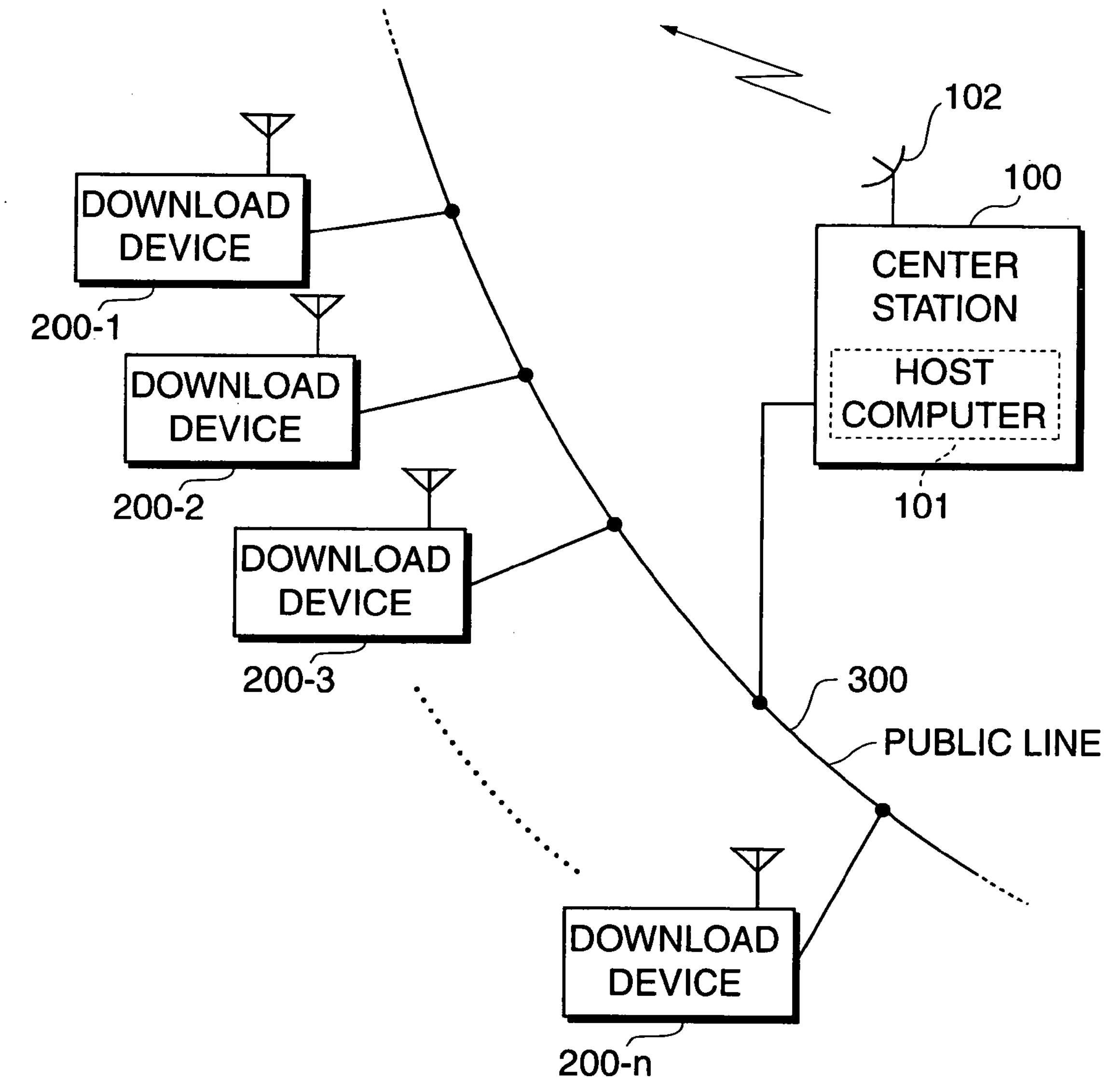
FIG. 1 is a schematic diagram showing the entire construction of a download system for portable players according to an embodiment of the present invention.

The present invention will be described below with reference to the drawings showing a preferred embodiment thereof. In the embodiment described below, an MP3 player having a flash EEP-ROM inside and a table which are used for the embodiment have substantially the same constructions as those in the above prior art. The MP3 player and table as well as their components carry the same reference numerals and description thereof is omitted.

FIG. 1 shows the entire construction of a download system for portable players according to an embodiment of the present invention. The present embodiment is a download system for portable players, which is suitable for providing a music data download service for subscribed users. This download system is comprised of a center station 100, and download devices 200-1, 200-2, 200-3, . . . , **200-*n* (hereafter collectively referred to as "the download device 200**").

The center station 100 and the download device 200 are connected to a public line 300 for transmission and reception of music data having type data, hereafter referred to.

The center station 100 provides music data for the download device 200 and is comprised of a host computer 101 for carrying out transmission of music data to the download device 200 and other processing, and a transmission means 102 for transmitting music data in terms of electric waves.

The public line 300 may be, for example, a telephone line, which is used to transmit music data from the center station 100 to the download device 200.

Figure 2:
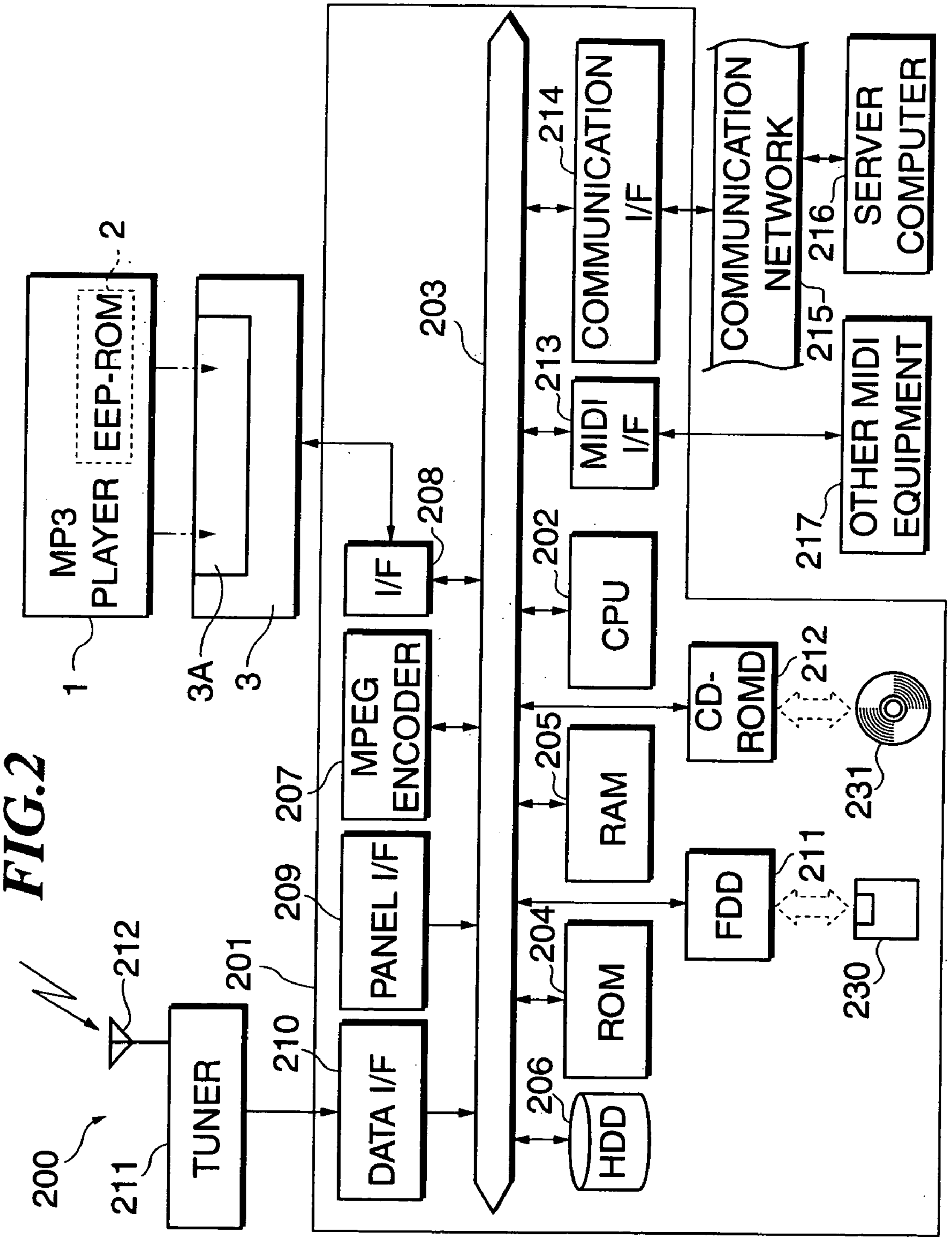
FIG. 2 is a block diagram showing the construction of one of download devices appearing in FIG. 1.

FIG. 2 shows the construction of the download device 200. The download device 200 is generally comprised of a personal computer 201, described later, and a tuner 211.

The personal computer 201 is comprised of a CPU 202 for controlling the entire personal computer, a ROM 204 that stores a control program and a download program (see FIG. 3) used by the CPU 202 to control components which are connected to the CPU 202 via a bus 203, and a writable RAM 205 for storing various data (for example, type data A, B, C, referred to later) and results of various arithmetic operations. The personal computer 201 further includes a hard disc drive 206 (hereafter referred to as "the HDD206") acting as a data storage means for storing music data, an MPEG encoder 207 that operates when music data stored in the HDD 206 are downloaded to the flash EEP-ROM 2 of the portable player 1, to encode the music data into MPEG codes, an interface 208 (hereafter referred to as "the I/F 208") for connecting the table 3 to the personal computer 201, a panel interface 209 (hereafter referred to as a "panel I/F 209") composed, for example, of a keyboard for inputting a command signal or desired type data to the CPU 202, a data interface 210 (hereafter referred to as "the data I/F 210") to which the tuner 211 is connected, a floppy disc drive (FDD) 211 for driving a floppy disc (FD) 230 as a storage medium, a CR-ROM drive (CD-ROMD) 212 for driving a compact disc read-only memory 231 that stores various application programs including the control program and various data, a MIDI interface (I/F) 213 for inputting a MIDI (Musical Instrument Digital Interface) signal from an external device and outputting the MIDI signal to an external device, and a communication interface (I/F) 214 for transmitting and receiving data to and from a server computer 216, for example, via a communication network 215. The components 202 to 214 are interconnected together via the bus 203, other MIDI equipment 217 are connected to the MIDI I/F 213, and the communication network 215 is connected to the communication I/F 214 has.

The I/F 208 is composed of a parallel interface and connects the bus 203 and the table 3 together. The flash EEP-ROM 2 of the MP3 player 1 stores music data having type data. When the MP3 player 1 is placed on the table 3, the I/F 208 reads type data (for example, genre data a1, singer data a2, number data a3, etc.) of music data currently stored in the flash EEP-ROM 2 of the MP3 player 1, and stores the same into the RAM 205 of the personal computer 201 as known type data A.

The panel I/F 209 operates when a user executes key inputs to input desired type data B (for example, genre data b1, singer data b2, number data b3, etc.), to read the desired type data B into the RAM 205 of the personal computer 201.

Further, the data I/F 210 is composed of a serial interface having a real-time transmission function as in an optical digital interface or IEEE 1394, and connects the bus 203 and the tuner 211 together. The data I/F 210 reads type data (for example, genre data c1, singer data c2, number data c3, etc.) of music data received by the tuner 211 and stores the same into the RAM 205 of the personal computer 201 as new type data C.

The tuner 211, acting as a reception means, is composed of a radio tuner or a satellite broadcasting tuner, and includes an antenna 212 if it is composed of a satellite broadcasting tuner. The tuner 211 receives music data having type data transmitted from the center station 100 and transmits them to the personal computer 201, while the type data, which are used as tag information for the music data, are read into the RAM 205 of the personal computer 201 as the new type data C.

A hard disc in the HDD 206 can store a control program executed by the CPU 5, and if the control program is not stored in the ROM 204, it can be stored in the hard disc and read into the RAM 205 so that the CPU 202 can perform the same operations as when the control program is stored in the ROM 204. This facilitates addition of a new control program, updating of the version of the control program, or the like.

The control program and various data read out from the CD-ROM 231 of the CD-ROM drive 212 are stored in the hard disc in the HDD 206. This facilitates installation of the control program, updating of its version, or the like. In addition to the CD-ROM drive 212, a magneto-optic (MO) disk device or the like may be provided for allowing the use of media in various forms.

As described above, the communication I/F 214 is connected to the communication network 215 such as a LAN (Local Area Network), Internet, or a telephone line, and to the server computer 216 via the communication network 215. If the above programs or various parameters are not stored in the hard disc in the HDD 206, the communication I/F 214 is used to download the programs or parameters from the server computer 216. The computer acting as a client (in the present embodiment, the personal computer 201) sends a command to the server computer 216 via the communication I/F 214 and the communication network 215 to request downloading of programs or parameters. In response to this command, the server computer 216 distributes the requested programs or parameters to the computer 201 via the communication network 215. The computer 201 then receives the programs or parameters via the communication I/F 214 and stores them in the hard disc in the HDD 206 to complete the downloading.

An additional interface may be provided for directly transmitting data to and from external computers or the like.

Next, the operation of the present embodiment constructed as described above will be described.

First, the operation of the download system for a portable player according to the present embodiment will be explained in brief.

This download system for a portable player downloads music data transmitted from the center station 100 to the flash EEP-ROM 2 of the MP3 player 1 when the user sets the MP3 player 1, which is currently inoperative, on the table 3. The user can store desired music data in the MP3 player 3 simply by inputting the desired type data B to the personal computer 201.

Figure 3:
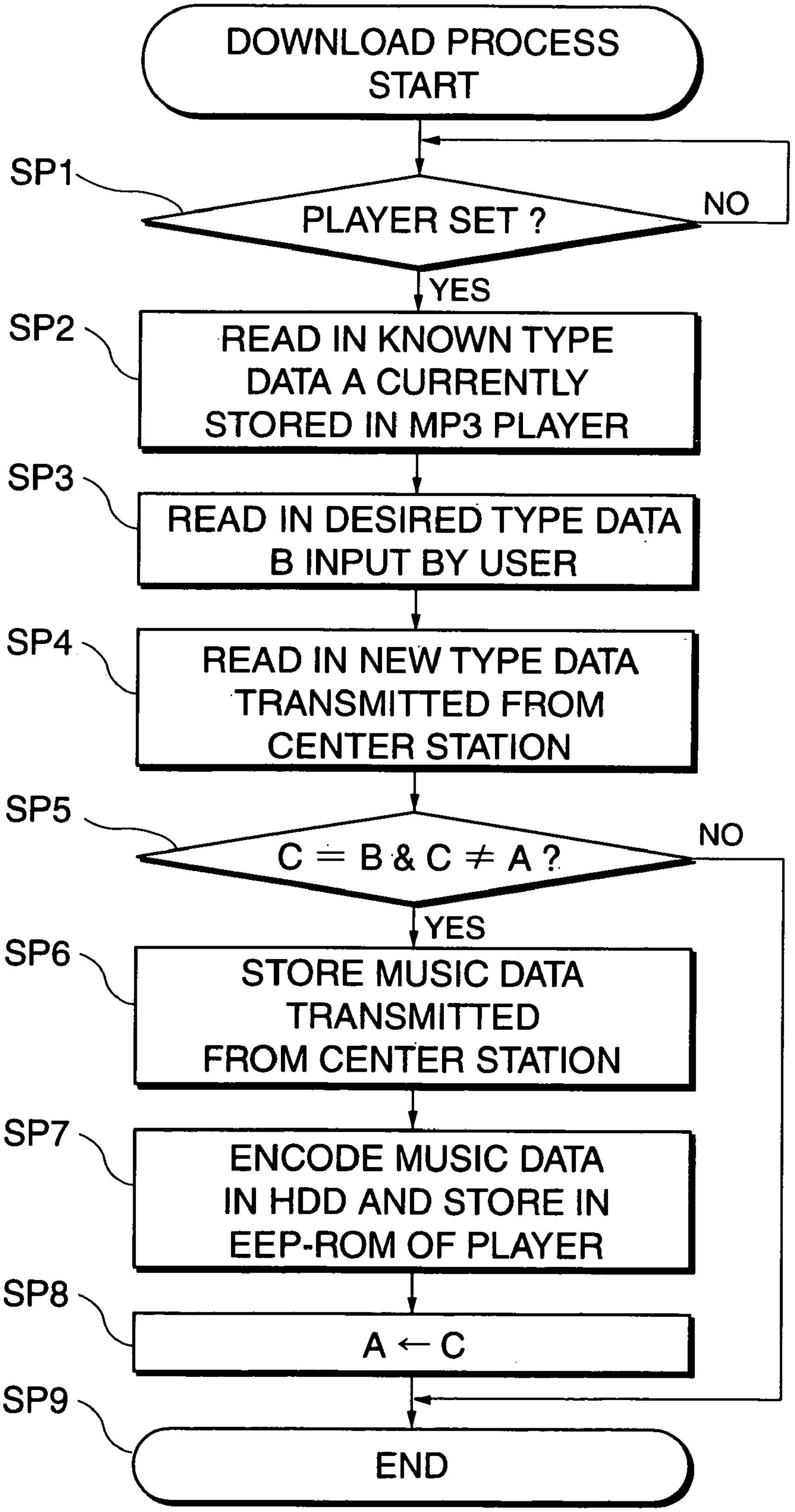
FIG. 3 is a flow chart showing the operation of the download device.
Figure 4:
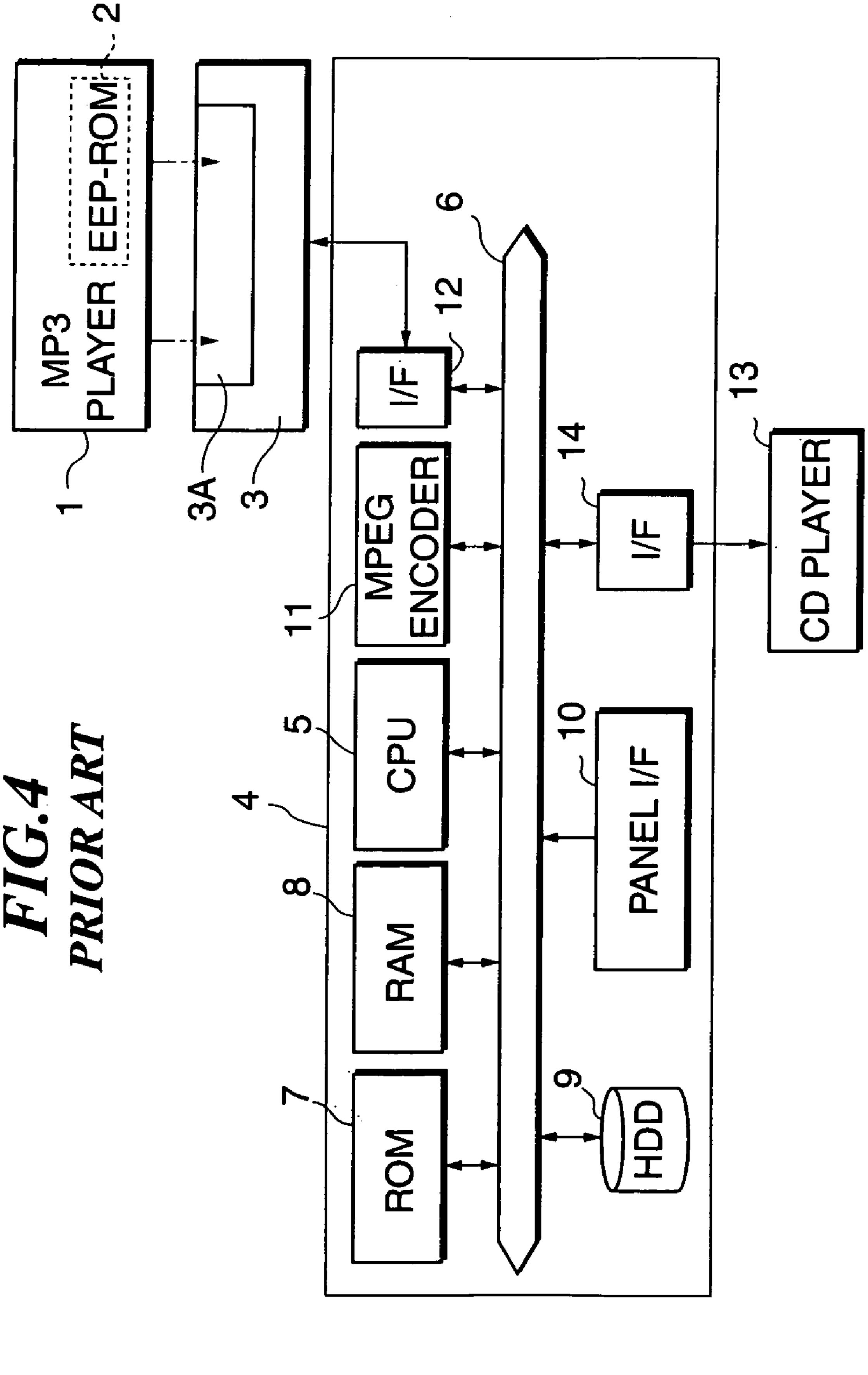
FIG.4 PRIOR ART
FIG. 4 is a block diagram showing the construction of an apparatus for downloading according to the prior art.

Next, the operation of the download device 200 will be described based on a download process shown in FIG. 3.

First, at a step SP1, it is determined whether or not the MP3 player has been set on the table 3, and the process stands by until the MP3 player 1 is set. If the MP3 player 1 has been set, the process proceeds to a step SP2.

At the step SP2, type data (genre data a1, singer data a2, number data a3) of music data stored in the flash EEP-ROM 2 of the MP3 player is read into the RAM 205 as the known type data A.

At a step SP3, type data (genre data b1, singer data b2, number data b3) of desired music input by the user using the panel I/F 209 is read into the RAM 205 as the desired type data B.

Further, at a step SP4, type data (genre data c1, singer data c2, number data c3) of music data received via the tuner 211 is read into the RAM 205 as the new type data C.

At a step SP5, it is determined whether or not the new type data C is the same as the desired type data B & the new type data C is different from the known type data A. If the result of the determination is negative, it is determined that the music data required by the user is different from the music data transmitted from the center station 100 or that the new music data has already been stored in the HDD 206 of the personal computer 201. Then, the process proceeds to a step SP9 to complete this process.

On the other hand, if the result of the determination at the step SP5 is affirmative, the process proceeds to a step SP6 to store in the HDD 206 the music data transmitted from the center station 100. The music data thus stored in the HDD 205 is encoded by the MPEG encoder 207 and then stored in the flash EEP-ROM 2 (a step SP7). Further, the new type data C stored in the RAM 205 is stored in the flash EEP-ROM 2 as the known type data A (a step SP8). This process is completed at the step SP9.

As described above, according to this download system for a portable player, the user can store the new music data in the MP3 player 1 without any cumbersome operating procedure, as required in the prior art system, simply by inputting the desired type data B to the personal computer 201 of the download device 200.

For example, the user has only to input type data to be downloaded, to the personal computer 201 at night, and then the music data corresponding to the input type data are automatically stored in the MP3 player 1 so that in the next morning the user can listen to the music through the MP3 player 1 at a location other than the user's house.

In the above described embodiment, the MP3 player 1 using the flash EEP-ROM as the storage medium is employed as an example of the portable player, but the present invention is not limited to this. The portable player may be an MD player using a mini disk (MD) as the storage medium, a player using a magnetic tape as the storage medium, or the like, and in this case, the MPEG encoder 207 may be omitted.

Further, the desired type data B input by the user may include only the genre data b1 and the singer data. That is, it suffices that the type data only enables the determination of whether the music is new and is not currently stored in the HDD 206.

Further, encoding may be carried out by the personal computer 201 without the use of the MPEG encoder 207.

The object of the present invention can also be achieved by providing a system or apparatus with a storage medium containing a software program code for realizing the functions of the above described embodiment and reading the program code from the storage medium by a computer (or the CPU 2 and an MPU) of the system or apparatus for execution.

In this case, the program code itself read from the storage medium realizes the novel functions of the present invention, and the storage medium containing the program code constitutes the present invention.

Examples of the storage medium containing the program code may be the floppy disk 230, the hard disk 206, an optical disk, a magneto optical disk, the CD-ROM 212, a CD-R, a non-volatile memory card, and the ROM 204. Alternatively, the program code may be supplied from the server computer 216 through the other MIDI equipment 217 and the communication network 215.

Of course, the functions of the above described embodiment can be realized not only by executing the program code read by means of the computer but also by executing a part or the whole of the actual processing by means of an operating system or the like working on the computer in accordance with commands of the program code.

Moreover, it goes without saying that the functions of the above described embodiment can be realized by executing a part or the whole of the actual processing by means of the CPU 5 provided in a function expansion board inserted in the computer or a function expansion unit connected to the computer in accordance with commands of the program code after the program code read from the storage medium is stored in a memory provided in the function expansion board or the function expansion unit.

What is claimed is:

1. In a download system for downloading music data sets, wherein each music data set includes music data and type data for identifying content characteristics of the music data, the type data being designatable by a user and including at least one of genre data, singer data, and number data, a download apparatus comprising:

a player including a storage medium for storing music data sets, said storage medium having stored previously downloaded music data sets;

a download device connectable to a center station for downloading new music data sets to said storage medium, wherein at least one of the new music data sets include desired type data that is designated by the user of the player and does not match any of the type data of the previously downloaded music data sets; and a reception device operatively coupled to said download device for receiving music data sets transmitted from said center station, wherein said reception device receives the new music data sets including the desired type data designated by the user;

a table operatively coupled to said download device for receiving and connecting said download device to said player, wherein, when it is determined that said player is connected to said table, said download device reads in the type data of the music data sets stored in said player as known type data, wherein said download device reads in the type data designated by the user as desired type data, and reads in the type data of each music data set transmitted from said center station as new type data, and wherein said download device download the transmitted music data set when it is determined based on the known type data, the desired type data, and the new type data that the transmitted music data set has not been stored in said storage medium.

2. A download apparatus according to claim 1, wherein said download device comprises:

an input device to which type data of desired music data sets required by the user is input by the user;

a data memory device that stores the music data sets transmitted from the center station; and a control device for selecting at least one of the music data sets from the center station for storing in said data memory device.

3. A download apparatus according to claim 2, wherein said control device comprises:

a known type data read-in device that reads in, as known type data, the type data of the previously downloaded music data sets previously stored in the storage medium of said player;

a desired type read-in device that reads in, as desired type data, the type data input by the user using said input device;

a new type data read-in device that reads in, as new type data, the type data of the new music data sets received by said reception device;

a determination device that determines, for each new music data set, whether the new type data of the new music data set is equal to the desired type data and whether the new type data of the new music data set is different from all of the known type data;

a data storing device for storing at least one new music data set transmitted from the center station in said data memory device when the determination device determines that the new type data of the at least one new music data set is equal to the desired type data but different from all of the known type data;

a downloading device that downloads the music data sets stored in said data memory device by said data storage device to the storage medium of said player; and a type data rewrite device that rewrites said new type data as known type data.

4. A download apparatus according to claim 1, wherein the storage medium of said player comprises a writable ROM, and wherein said download device includes an encoding device that encodes music data into MPEG codes.

5. A download apparatus according to claim 1, wherein said player is a portable player.

6. A download apparatus according to claim 1, wherein the center station transmits the new music data sets to said download device.

7. A download apparatus according to claim 2, wherein said download device comprises a receptor which said player is coupled when music data is download to said player.

* * * * *